United States Patent
De Blasi

(10) Patent No.: US 7,909,599 B2
(45) Date of Patent: Mar. 22, 2011

(54) INJECTION NOZZLE FOR GUIDING HOT-MELT PLASTIC WITHIN A MOLD

(75) Inventor: Salvatore De Blasi, Lüdenscheid (DE)

(73) Assignee: Hasco-Hasenclever GmbH + Co. KG, Luedenscheid (DE)

( * ) Notice: Subject to any disclaimer, the term of this patent is extended or adjusted under 35 U.S.C. 154(b) by 0 days.

(21) Appl. No.: 12/298,821

(22) PCT Filed: Nov. 27, 2007

(86) PCT No.: PCT/DE2007/002137
§ 371 (c)(1),
(2), (4) Date: Jan. 21, 2009

(87) PCT Pub. No.: WO2008/064654
PCT Pub. Date: Jun. 5, 2008

(65) Prior Publication Data
US 2009/0232931 A1   Sep. 17, 2009

(30) Foreign Application Priority Data

Nov. 28, 2006 (DE) .......................... 10 2006 056 435
Nov. 16, 2007 (DE) .......................... 10 2007 055 069

(51) Int. Cl.
*B29C 45/23* (2006.01)
(52) U.S. Cl. ..................................... 425/564; 264/328.9
(58) Field of Classification Search .................. 425/564; 264/328.9
See application file for complete search history.

(56) References Cited

U.S. PATENT DOCUMENTS 5,984,661 A * 11/1999 Vorkoper ....................... 425/564
6,722,874 B1   4/2004 Moeser .......................... 425/564

FOREIGN PATENT DOCUMENTS

| DE | 19516491 | 11/1996 |
| DE | 19611880 | 10/1997 |
| JP | 61104818 | 5/1986 |
| JP | 07223241 | 8/1995 |
| JP | 08174605 | 7/1996 |
| JP | 2003103581 | 4/2003 |
| WO | WO-2006054818 | 5/2006 |

* cited by examiner

*Primary Examiner* — Tim Heitbrink
(74) *Attorney, Agent, or Firm* — Andrew Wilford

(57) ABSTRACT

Among other things, the invention relates to an injection nozzle for guiding hot-melt plastic within a mold, particularly an injection mold. Said injection nozzle comprises a nozzle housing (11) and a nozzle needle (13) which is mounted in a translationally movable manner and is used for opening and closing a melt opening that leads to a mold cavity. The nozzle needle (13) can be moved by means of a driving mechanism (V) to which a transmitting device (14) is assigned that allows a movement of the driving mechanism (V) to be converted into a movement of the nozzle needle (13). The invention is characterized, inter alia, in that the transmitting device (14) is assigned to an attached unit (22) which can be releasably connected to the injection nozzle (10) and inside which a rod assembly (30) is disposed at least in part. Said rod assembly (30) is connected to the driving mechanism (V) at an input end while being connected in a rigid, tenacious, and compression-resistant manner to the nozzle needle (13) at an output end.

17 Claims, 6 Drawing Sheets ial phase of PCT applica-# INJECTION NOZZLE FOR GUIDING HOT-MELT PLASTIC WITHIN A MOLD

CROSS REFERENCE TO RELATED APPLICATIONS

This application is the US national phase of PCT application PCT/DE2007/002137, filed 27 Nov. 2007, published 5 Jun. 2008 as WO2008/064654, and claiming the priority of German patent application 102006056435.9 itself filed 28 Nov. 2006 and PCT patent application PCT/DE2007/002137 itself filed 27 Nov. 2007, whose entire disclosures are herewith incorporated by reference.

FIELD OF THE INVENTION

The invention relates first to a nozzle for injecting hot melted plastic into a mold, particularly an injection mold having a nozzle housing and a nozzle needle mounted to move in a straight line to open and close a melt opening that leads to a mold cavity, is with the nozzle needle being moved by an actuator having its own transmission that converts movement of the actuator into a movement of the nozzle needle. Such an injection nozzle has a nozzle core that has a melt passage. The melt coming from the hot passage flows from the melt passage via the injection opening directly or indirectly into the mold cavity. By axially moving the nozzle needle that is part of the injection nozzle, the injection opening can be opened or closed. In the prior art, various methods are used to actuate the nozzle needle.

DE 195 16 491 describes an injection nozzle where the nozzle needle can be reciprocated in a straight line in a nozzle housing. The actuator is a hydraulic cylinder. A rear end of the nozzle needle has a seat with a recess that runs transverse to the longitudinal axis. In the recess, a translating part of the actuator is guided in a manner allowing it to slide relative to the seat. The end of a translating part is set at an angle to the longitudinal axis of the actuator-side area of the translating part. In this manner, the straight-line movement of the translating part can be converted into a differently directed straight-line movement of the nozzle needle. However, the structure of the injection nozzle in accordance with DE 195 16 491 is relatively large and the assembly is quite complex.

DE 199 55 320 [U.S. Pat. No. 6,722,874] describes an injection nozzle that has a transmission that converts rotation into axial straight-line movement of the nozzle needle. The transmission is set in the mounting plate. The actuator is executed by a worm gear that meshes with an output gear wheel that is firmly connected to a sleeve. An end of the nozzle needle opposite the tip of the needle extends through the sleeve. The end has two diametrically opposite probe elements that are accommodated in slot-shaped gates of the sleeve. Furthermore, the needle element has a locking piston.

When the worm gear rotates, the sleeve rotates, with the gates arranged in the sleeve also rotating and guiding the probe elements of the nozzle needles according to the shape of the groove. Rotation of the sleeve is therefore converted into a straight-line movement of the nozzle needle. In this way, the sprue of the mold cavity can be opened and closed, with the shape of the groove defining the characteristics of the movement of the nozzle needle.

DE 196 11 880 describes an injection mold tool with a plurality of injection nozzles. A hydraulic cylinder actuates the nozzle needles of the injection nozzles by means of a fork-shaped slider. The slider has grooves that cooperate with guide projections of needle carrier elements that are part of each injection nozzle. The needle carrier elements are formed as pistons, with each piston being supported in simple bearings in a guide sleeve that set in the mold plate. The guide sleeve is movable relative to the guide sleeve fixed in the molding plate.

WO 2006/054,818 describes an injection nozzle whose nozzle needle is held in a bearing housing at the ends. A slider of the actuator has an angled face by means of which movement of the slider can exert pressure on the nozzle needle and thus move the nozzle needle against the restoring force of a spring between a position that unblocks the melt outlet opening and a position that blocks the melt outlet opening.

Proceeding from WO 2006/054,818, the object of the invention is to provide an injection nozzle that guarantees safe operation even at high temperature loads, and is furthermore improved with respect to handling and production.

OBJECT OF THE INVENTION

In a first aspect, the object of the invention is attained in that the injection nozzle has a transmission by means of which movement can be transmitted from the actuator to the nozzle needle. The transmitted movement can be a converted movement, for example. The direction as well as the type of movement of the nozzle needle and the actuator may be different. Movement of the actuator may be linear in one direction, for example, whereas the nozzle needle moves linearly in a different direction. Alternately, the actuator may rotate, whereas the nozzle needle moves in a straight line. Alternately, there may be no relative movement between the actuator and the nozzle needle. Thus the actuator may move in a straight line parallel to the movement of the nozzle needle.

The transmission is part of an add-on unit that can be detachably connected to the injection nozzle. The add-on unit may comprise a housing, for example. The add-on unit may be mounted on the injection nozzle or on a mold plate by means of a screw connection, for example. There is no relative movement between the add-on unit and the molding plate and/or the injection nozzle. A rod assembly is arranged at least in part inside the add-on unit. The rod assembly may be comprised of a single part, for example. Alternately, the rod assembly may be comprised of a plurality of parts, for example. The parts of the rod assembly can be connected together rigidly or by pivots, for example. The rod assembly can be arranged at least in part inside a housing of the add-on unit, for example. Thus, it is possible to seal off the housing from the outside. Lubrication can then be done in a simple manner inside the housing. An input end of the rod assembly can be arranged outside the housing for connection with the actuator, for example. The outside part of the rod assembly can be sealed with respect to the housing to prevent lubricant from leaking out of the housing. At an output side, the rod assembly is connected to the nozzle needle in a manner to transmit force in two opposite directions.

Furthermore, it is possible to provide a melt guide inside the add-on unit. This then allows the option of feeding the melt through the add-on unit to the injection nozzle. A temperature controller, such as a heating element, for example, can be provided on the add-on unit to control the temperature of the melt.

The advantage of the invention is that the transmission and the housing can be detached from the nozzle and combined with other nozzles in a simple manner. Other than the mounting space for the housing, no other guides are required on the mold. The rigid attachment of the nozzle needle at the rod assembly can be made such that the nozzle needle can be attached and detached in a simple manner. Changing the nozzle needle may be required, for example, when the actuator is used in combination with a different nozzle.

The transmission can be connected to the actuator outside the housing, for example. For example, a first coupling element connected to the nozzle needle to move therewith can cooperate with a second coupling element connected to the actuator to move therewith. In accordance with the invention, construction of the actuator is especially easy because in this way a lesser number of parts have to be detached and/or attached during assembly and/or disassembly.

According to a first embodiment, the input end of the rod assembly is at least in part arranged outside the add-on unit. In this way the housing can be attached and detached from the nozzle core in a particularly easy manner because it is not necessary to open the housing to connect the actuator to the transmission. The part of the transmission that projects from the housing can be directly or indirectly connected to the nozzle needle to move therewith. In case of an indirect movable connection, gears may be provided between the projecting part and the nozzle needle, for example.

According to a first embodiment, the transmission is formed by a motion converter, by means of which the movement of the actuator can be converted into a different movement of the nozzle needle. By means of the transmission, it is possible to change the movement of the actuator into a different movement or a differently directed movement of the nozzle needle. For example, a rotation of the actuator can be converted into a straight-line movement of the nozzle needle. Alternately, for example, a straight-line movement in the actuator can be converted into a differently oriented straight-line movement of the nozzle needle.

According to another embodiment, a melt passage is formed in the housing. The melt passage can direct the melt from an opening in the hot-melt passage to a melt passage provided in the nozzle core, for example. Alternately, the melt can be guided directly from the injection cylinder into the melt passage of the housing, for example. In a system of several nozzles, for example, the melt passage can be formed in the nozzle core such that the transmission and all the respective nozzles of the system are combinable.

According to another embodiment, the melt passage is arranged at least in part at a spacing from the nozzle needle and/or the transmission. The offset guiding of the hot melt reduces the thermal influence on the transmission and the nozzle needle. In this way, malfunctions due to thermal overload are prevented. For example, the nozzle needle is at a spacing from the melt passage between the melt passage and an actuation element of the actuator.

According to another embodiment of the invention, the actuator has a drive link. By means of the drive link, the output movement of a motor, for example, or a hydraulic or pneumatic linear actuator, can be transmitted to the actuator over a distance.

According to another embodiment, the drive link is formed by a part movable in a straight line. This slider can be provided and attached to and/or detached from the mold in a simple manner. Furthermore, the slider guarantees with certainty the transmission of movement from the actuator to the transmission and is not very prone to temperature fluctuations.

According to another embodiment, the transmission has a pin-shaped slide block that is guided in a slot or groove. By means of the guiding of the slide block in the groove it is possible, for example, to control the movement of the nozzle needle and to convert the movement of the actuator into a differently oriented movement of the nozzle needle. The groove can be formed in or attached to a slider, for example.

The angle of inclination in the gate relative to the axis of movement of the actuating element also determines, among other things, the movement of the nozzle needle. If necessary, a simple change of the movement behavior of the nozzle needle can be made by bringing the slide block into engagement with another groove with a different inclination. By means of the slide block, it is possible to compensate for small angular offsets between essentially parallel movement of the nozzle needle and the actuator. The slide block can be formed with a cylindrical peg, for example. The cylindrical peg can be of metal, for example.

According to another embodiment, the slide block is at least indirectly part of the nozzle needle and the groove is part of the actuator. The groove can be part of an actuating element of the actuator. For example, the groove can be formed by the actuating element. The movement conversion can then be changed by exchanging the actuating element, for example.

According to another embodiment of the invention, the actuator has at least two grooves that can be used optionally. The grooves can be shaped differently. In particular, the grooves can have different inclines, which results in different movement characteristics for the nozzle needle, depending on the selection of the groove. The actuator can have a plurality of such grooves. Obtaining a different movement conversion merely requires detaching the slider and reattaching it with a different orientation.

According to another embodiment, the transmission has a holder part to which the nozzle needle can be attached with a positive and/or non-positive fit, in particular detachably. The holder part at which the nozzle needle is firmly held can be made such that the nozzle needle can be detached and attached in a simple manner. In this way, the transmission can be easily combined with various nozzles, even if this requires different nozzle needles, for example. An attachment head of the nozzle needle can be arranged between a seat part and a counter element, for example. The counter element can be screwed to the seat part, for example.

According to another embodiment, the housing has at least one center hole in which the nozzle needle is supported in simple bearings. The center hole can be oriented such that when the housing is assembled, the center hole of the housing is aligned with the nozzle core and with a center hole of the nozzle core.

The invention furthermore relates to an injection nozzle system for supplying hot melt in a mold, in particular in an injection mold, in accordance with the preamble of claim 11.

According to a second aspect of the invention, the object of the invention mentioned above is attained in that the transmission is held by a separate add-on unit, for example comprising a housing that is combinable with different nozzle cores of an injection nozzle system.

The injection nozzle system in accordance with the is invention has the advantage that a lesser number of spare parts must be kept on hand because an add-on unit with a transmission held thereon is combinable with various nozzle cores having different properties.

Furthermore, manufacture can be done in a simpler manner because a lesser number of parts must be produced for the injection nozzle system as for a great number of different conventional injection nozzles.

Maintenance measures are easier to perform because the housing can be detached and reattached as a whole with the transmission.

BRIEF DESCRIPTION OF THE DRAWING

Other advantages of the invention follow from the embodiments shown in the figures in which.

SPECIFIC DESCRIPTION

Figure 1:
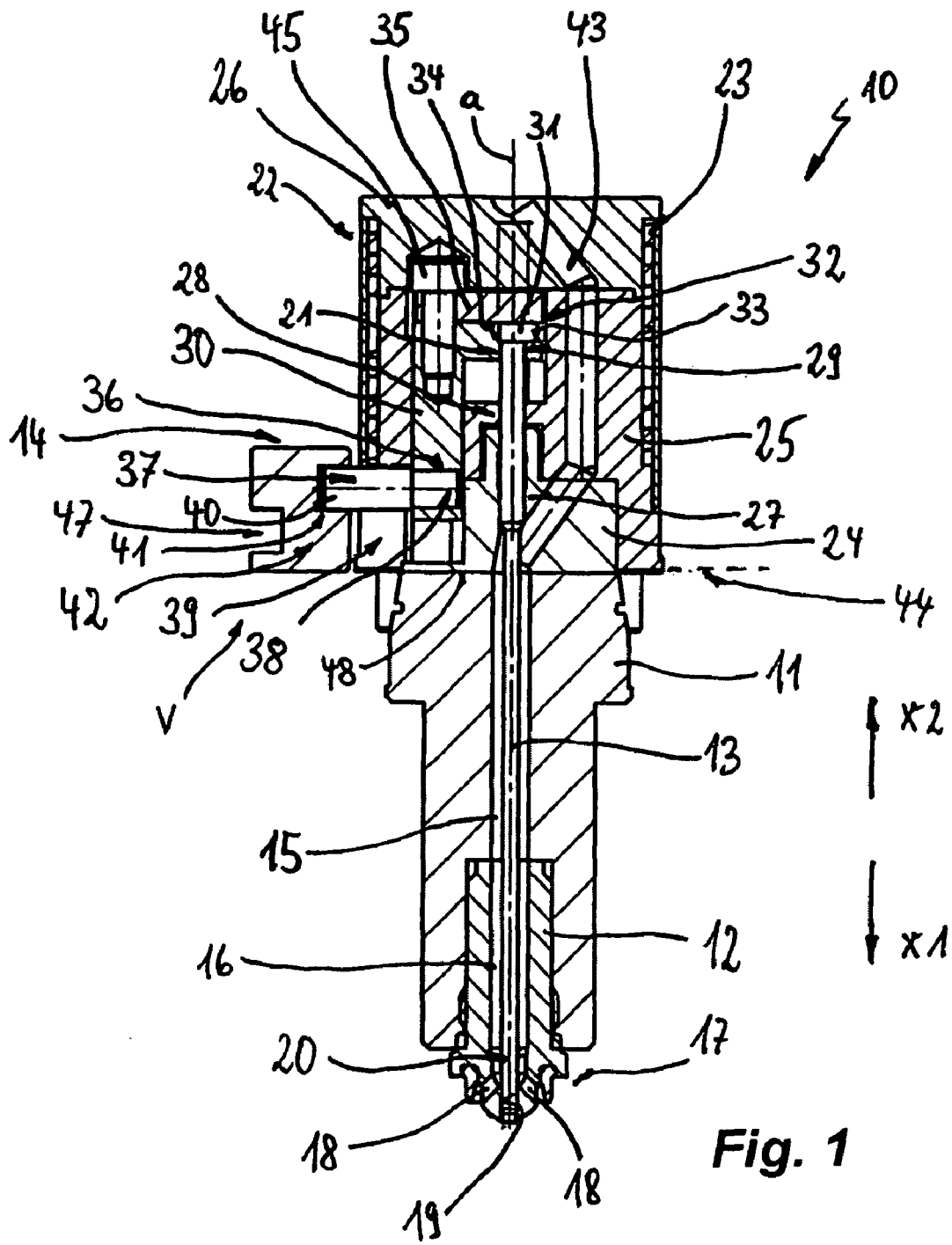
FIG. 1 is a schematic sectional view of the injection nozzle in accordance with the invention, with add-on unit and transmission, FIG. 2, schematic perspective view of the add-on unit with transmission.

An injection nozzle is shown generally at 10 in the figures. In as far as different embodiments are shown in the following, the same elements always have the same reference characters, even if there are physical differences.

The injection nozzle 10 essentially has a nozzle core 11, a nozzle tip 12, a nozzle needle 13 and a transmission 14. By means of the transmission 14 according to FIGS. 1 to 3, the directions y1 and y2 of movement (see FIG. 2) of an actuator V can be converted into respective directions x1 and x2 of movement of the nozzle needle 13.

According to FIG. 1, the nozzle core 11 has a melt passage 15 that is extended as a melt passage 16 of the nozzle tip 12. The melt passage 16 branches at an outer end 17 of the nozzle tip 12 into branch passages 18. The hot melt can flow via the branch passages 18 into a dome-shaped antechamber (not shown) whence a sprue (also not shown) branches to a mold cavity. The sprue can be closed by the nozzle needle 13 when the nozzle needle tip dips into it. If the nozzle needle 13 is moved out of the sprue, the melt can flow into the mold cavity.

Furthermore, a bore 19 is formed in the end 17 of the nozzle tip 12, in which a front end 20 of the nozzle needle 13 is guided. Because the end 20 of the nozzle needle 13 always remains in the bore 19, the hot melt cannot travel through the bore 19. The nozzle needle 13 can be moved in a straight line along a longitudinal axis a in the directions x1 and x2.

A rear end 21 of the nozzle needle 13 opposite the front end 20 is supported in a housing 22. The housing 22 is enclosed by a heater formed as a coiled tubular heating element 23. The temperature of the housing 22 can be controlled by means of the tubular heating element 23.

Figure 2:
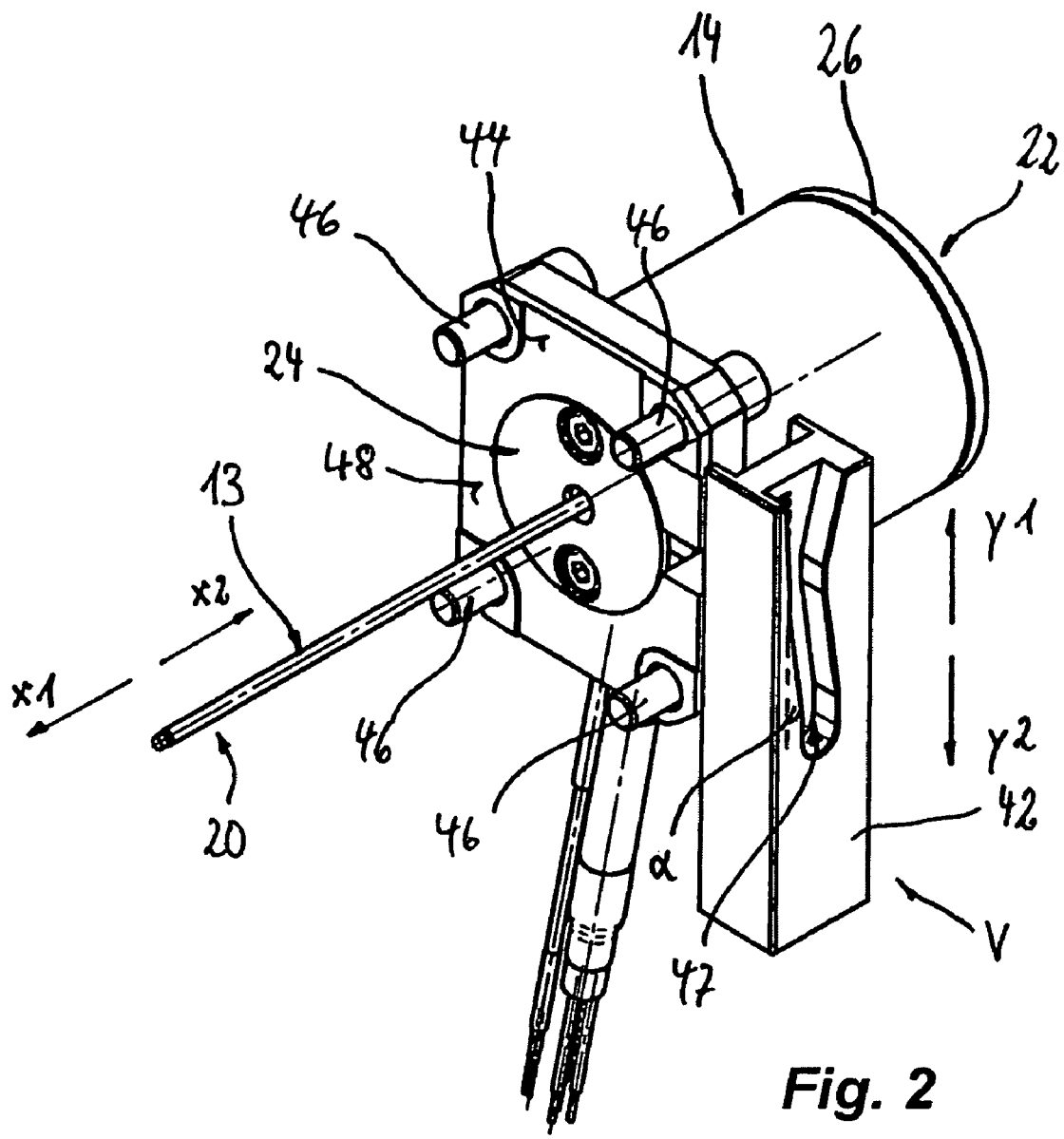
Figure 3:
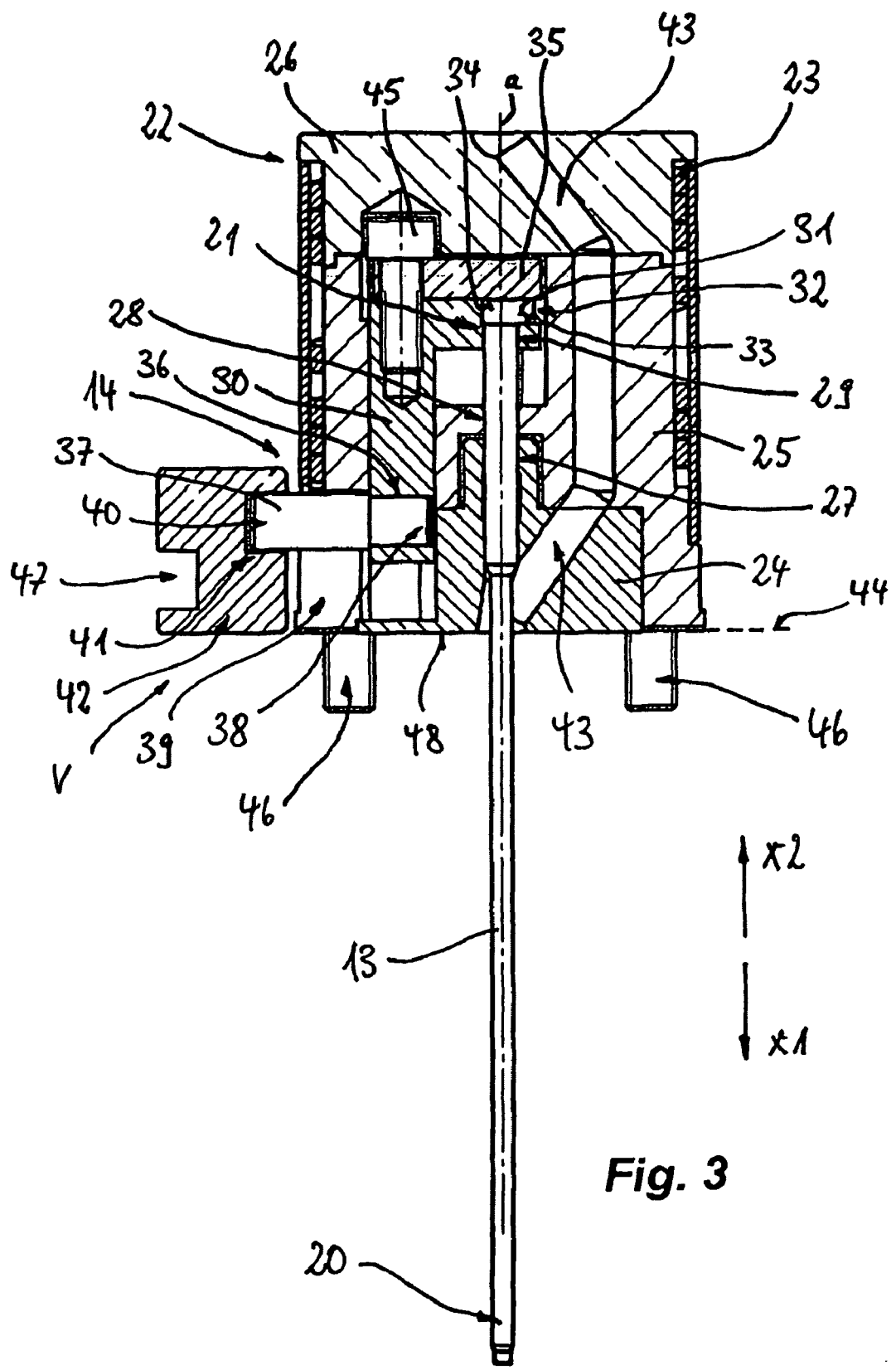
FIG. 3 is a schematic sectional representation of the add-on unit like FIG. 1.
Figure 4:
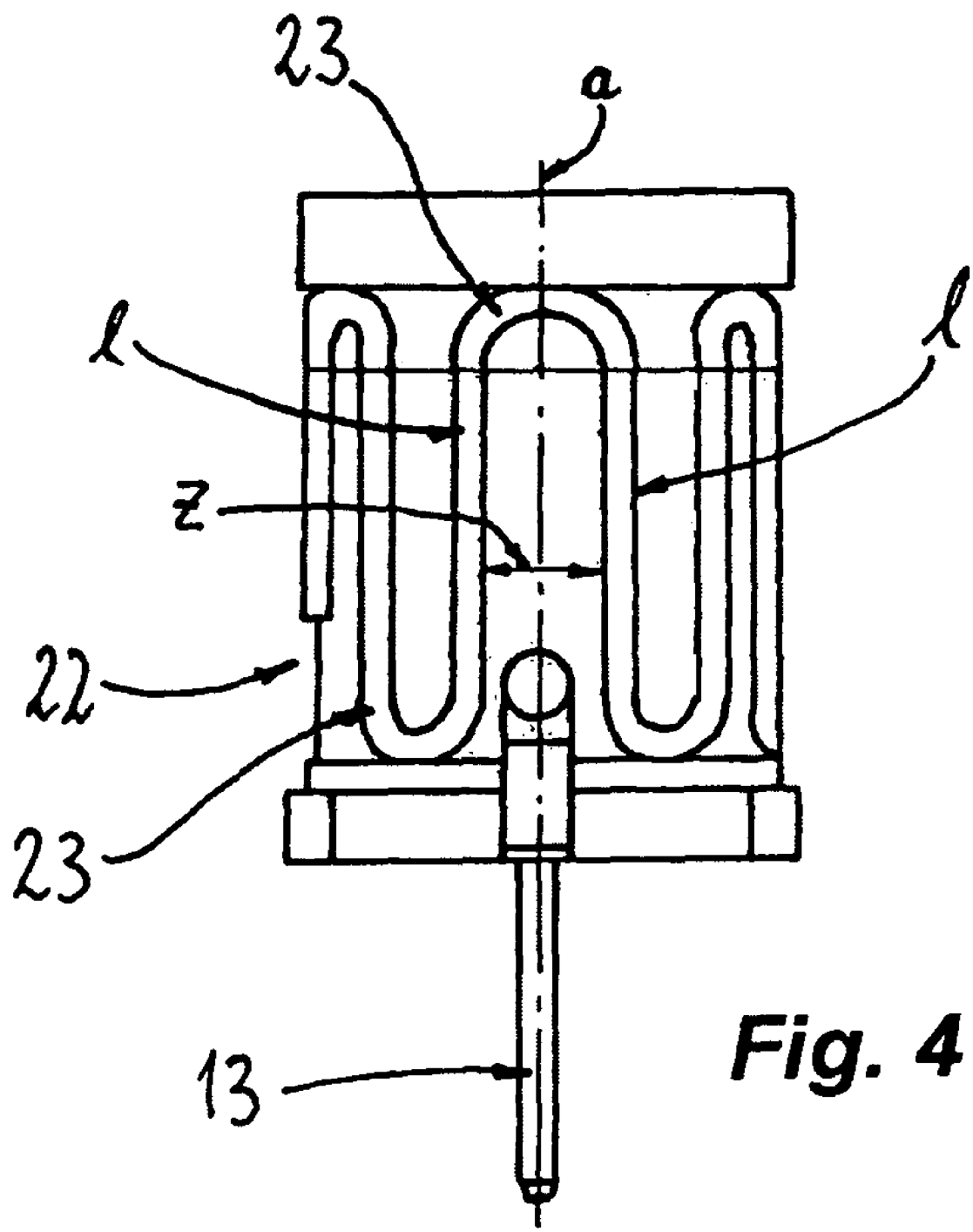
FIG. 4 is a schematic view of the add-on unit with a tubular heating element.

Alternately to what is shown in FIGS. 1 to 3, the tubular heating element can be shaped as a meander around the housing 22 (see FIG. 4). For example, by selecting a distance z between longitudinal sections l of the tubular heating element 23 running parallel to the longitudinal axis a, more heat can be applied to specific areas of the housing 22 than to other areas.

According to FIG. 1, the end 21 of the nozzle needle 13 extends through a center bore 27 in an insert part 24, a bore 28 in a seat part 25 as well as a bore 29 of a holder part 30. The nozzle needle 13 fits snugly and can slide in the center bore 27. The nozzle needle 13 fits with play in the bores 28 and 29 on the other hand.

The nozzle needle 13 has a head 31 that fits in a seat 32 between a stop surface 33 of the holder part 30 and an opposing surface 34 of a plate 35. This plate 35 is attached to the holder part 30 by means of a screw 45. The head 31 of the nozzle needle 13 fits complementarily in the seat 32 such that it is gripped between the holder part 30 and the head 31 and the nozzle needle 13 is thus prevented from rotating about the longitudinal axis a.

The holder part 30 has a separate bore 36 in which an entrainment pin 37 with an end 38 is firmly press fitted. The entrainment pin 37 extends through a longitudinal slot 39 in the seat part 25. The assembly comprised of the entrainment pin 37, holder part 30, plate 35 and nozzle needle 13 is accommodated in the housing 22 such that movement in the directions x1 and x2 is possible.

The entrainment pin 37 has an outer end 40 that is engaged with a groove 41 of a slider 42. The slider 42 is part of the actuator V and can be moved by a hydraulic piston (not shown), for example. The slider 42 can be moved in a straight line in the directions y1 and y2.

The following examples the operation of the injection nozzle:

Movement of the slider 42 in one of the directions y1 and y2 (see FIG. 2) causes the groove 41 formed in the slider 42 to move the entrainment pin 37 in the groove 41 and in the slot 39, in one of the directions x1 and x2. The slot 39 only allows movement of the entrainment pin 37 in the directions x1 and x2. The travel speed of the entrainment pin 37 depends on the travel speed of the slider 42 as well as an angle α of the groove 41. Because the entrainment pin 37 is connected to move with the holder part 30, movement of the entrainment pin 37 in one of the directions x1 and x2 also moves the holder part in the corresponding direction x1 and/or x2. Via the head 31, which is connected to the slider 30 to move therewith, the nozzle needle 13 also executes a movement in the corresponding direction x1 and/or x2.

A melt passage 43 is formed in the insert part 24, the seat part 25 and a cover part 26 of the housing 22. The melt passage 43 runs at a spacing from the transmission 14. On a flange plane 44 where a lower housing surface 48 of the housing 22 sits on the nozzle core 11, the melt passage 43 opens into the melt passage 15. Guiding the melt at a spacing from the transmission 14 and the nozzle needle 13 in the melt passage 43 prevents malfunction of the nozzle 10, in particular the nozzle needle 13, due to overheating of the transmission 14.

The housing 22 with the transmission 14 is combinable with various nozzle cores 11. By detaching flange screws 46 (see FIG. 2), the housing 22 can be separated from a hot passage (not shown) and thus detached from the nozzle core 11. Maintenance measures can be performed easily in this manner. Furthermore, the housing 22 with the transmission 14 can be connected to another nozzle core 11, for example. To that end, the housing 22 may be shaped such that it is combinable with various nozzle cores.

If applicable, the combination with another nozzle core 11 may only require inserting another nozzle needle 13. The nozzle needle 13 can be replaced in a simple manner by first detaching the cover part 26 of the housing 22 from the seat part 25. Then the screw 45 can be detached and the counter plate 35 removed from the holder part 30. The nozzle needle 13 can then be removed and replaced with another nozzle needle 13. Assembly is performed in the opposite order.

According to FIGS. 1 to 3, in addition to the groove 41, the slider 42 also has another groove 47 that can have a different angle relative to the groove 41, for example. By rotating the slider 42 by 180° C., the entrainment pin 37 can be fitted in the other groove 47.

Figure 7:
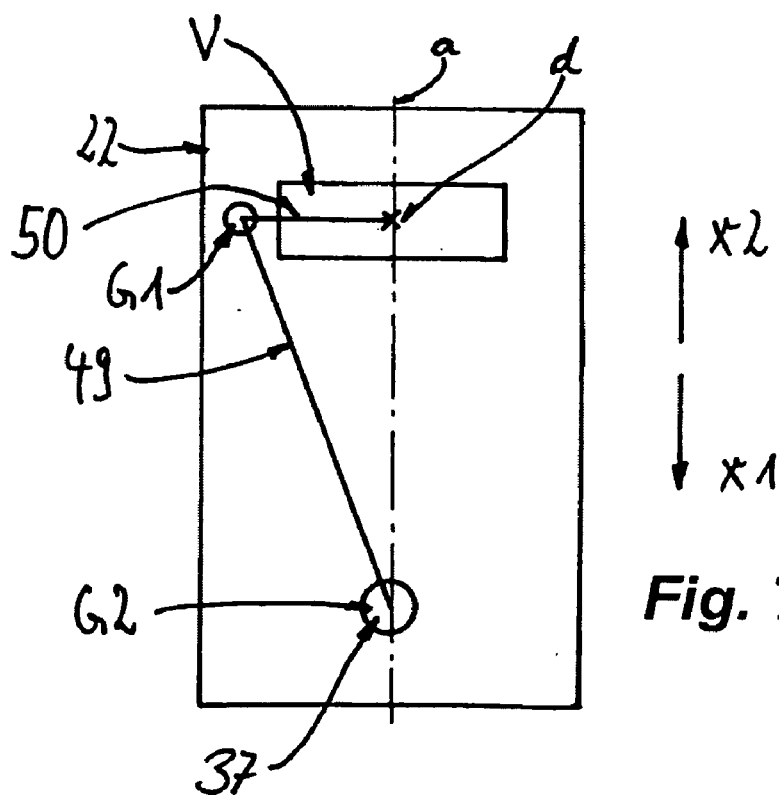
FIG. 7 is a different embodiment of the actuator seen as in FIG. 6.

Alternatively to the embodiments according to FIGS. 1 to 3, the actuator V according to FIG. 7 can have a crank 50 that is rotatable around a center of motion d. A rod 49 is pivoted on the crank 50 at G1, and pivoted on the entrainment pin 37 at G2. Because the entrainment pin 37 is guided, it is moved by the rod 49 in the direction x1 and/or x2. In this embodiment, the housing 22 as well as the nozzle core 11 can be shaped corresponding to the embodiment shown in FIGS. 1 to 3.

Furthermore, it is not absolutely necessary that there be a change in movement direction between the actuator V and the nozzle needle 13. Alternately to the embodiments shown in FIGS. 1 to 3 and 7, the actuator V according to FIGS. 5 and 6 can be made as a linear actuator, such as a hydraulic cylinder, for example. The actuator V can move its piston rod 49 in the directions x1 and x2, for example. The piston rod 49 can be firmly attached to the entrainment pin 37, so that the entrainment pin 37 and thus also the nozzle needle 13 can be moved in the directions x1 and x2.

Figure 5:
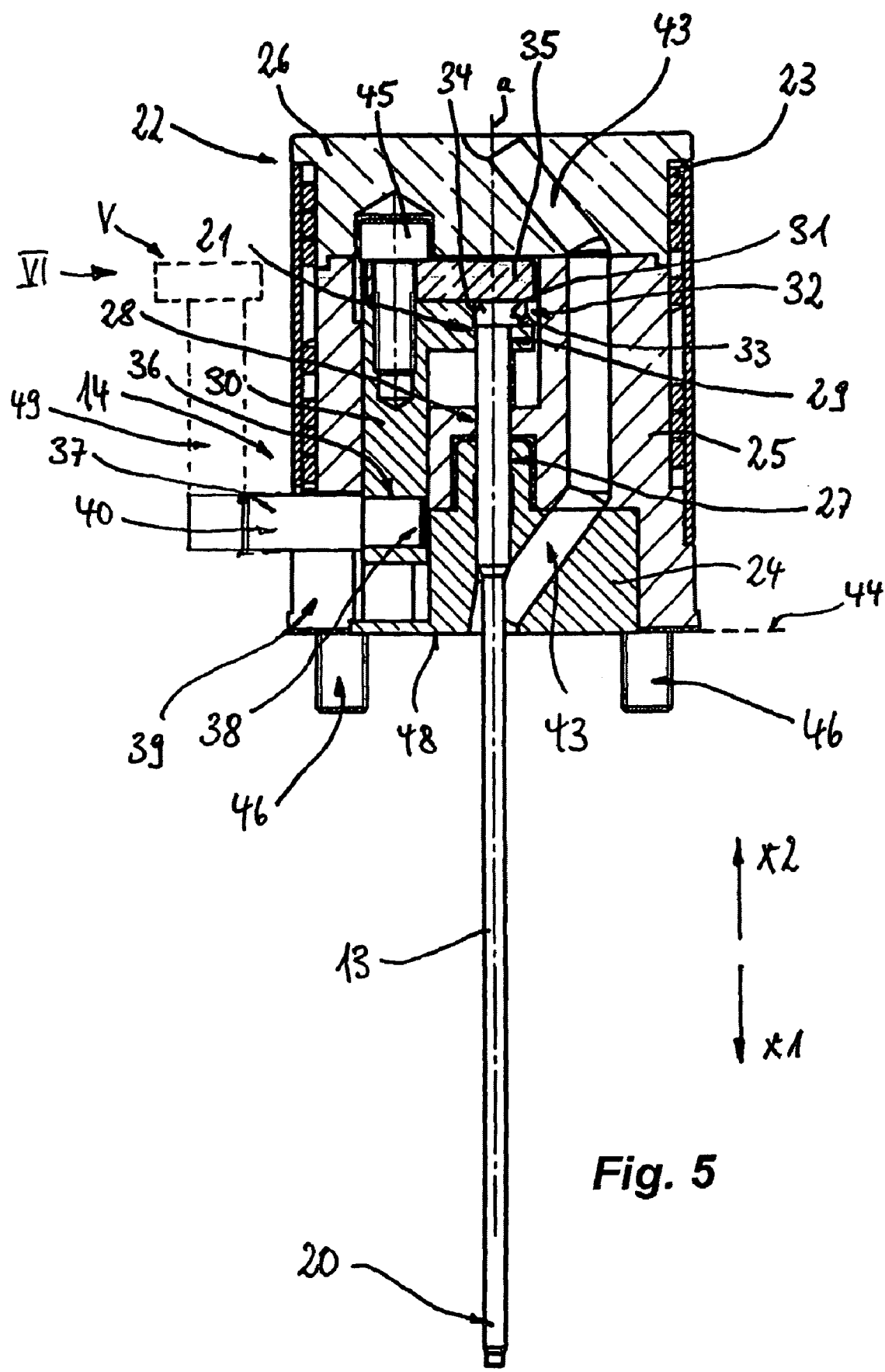
FIG. 5 is a sectional view of the add-on unit where the actuator is a linear actuator operating parallel to the nozzle needle, like FIG. 3.
Figure 6:
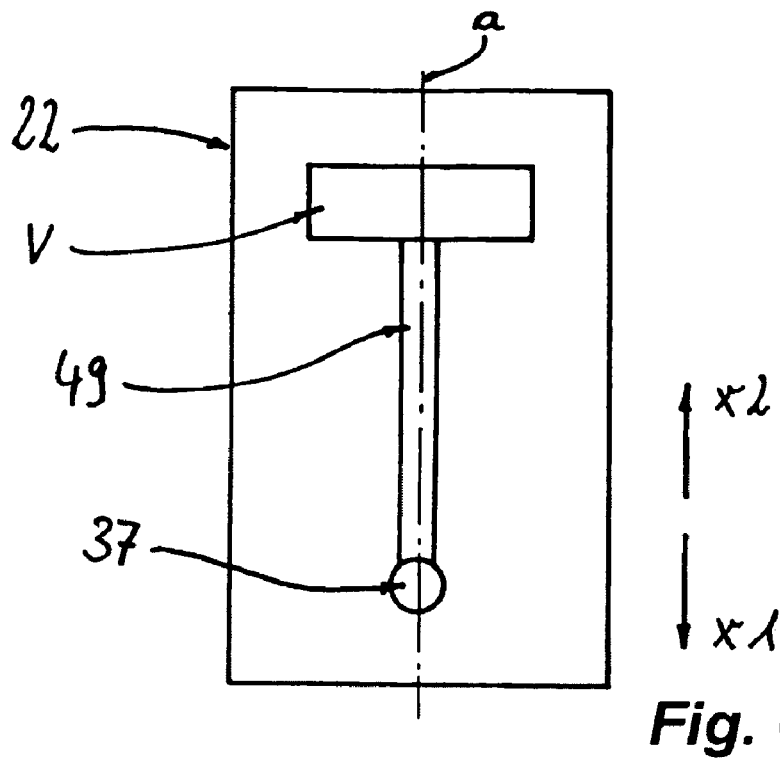
FIG. 6 is a schematic view of the actuator according to arrow VI in FIG. 5.

For the embodiments according to FIGS. 5 to 7, the housing 22 can also be connected to various nozzle cores 11.

The invention claimed is:

1. An injection nozzle for supplying hot-melt plastic in an injection mold having a nozzle housing and a nozzle needle mounted to move in a straight line to open and close a melt opening that leads to a mold cavity, with the nozzle needle being moved by an actuator having a groove, and with the actuator having its own transmission by which movement of the actuator is converted into a movement of the nozzle needle wherein the transmission has a pin-shaped slide block that is guided in the groove, that is indirectly connected to the nozzle needle, and that is part of a separate add-on unit that is detachably mounted on the injection nozzle and in which a rod assembly is arranged at least in part, with the rod assembly being connected at an input end to the actuator and at an output end to the nozzle needle to transmit force therebetween in two directions.

2. The injection nozzle in accordance with claim 1 wherein the input end of the rod assembly is arranged at least in part outside the add-on unit.

3. The injection nozzle in accordance with claim 1 wherein the transmission is a movement converter by means of which the movement of the actuator can be converted in a different movement of the nozzle needle.

4. The injection nozzle in accordance with claim 1 a melt passage is formed in the add-on unit.

5. The injection nozzle in accordance with claim 4 wherein the melt passage is arranged at least in part at a spacing from the nozzle needle and/or the transmission.

6. The injection nozzle in accordance with claim 1 wherein the actuator has a drive link.

7. The injection nozzle in accordance with claim 6 wherein the drive link has a part movable in a straight line.

8. The injection nozzle in accordance with claim 1 wherein at least two of the grooves are part of the actuator and can be used alternately.

9. The injection nozzle in accordance with claim 1 wherein the rod assembly has a holder part to which the nozzle needle is fixed with a non-positive and/or positive fit.

10. The injection nozzle in accordance with claim 1 wherein the nozzle needle can be detachably mounted on the rod assembly.

11. The injection nozzle in accordance with claim 1 wherein the housing has at least one central bore in which the nozzle needle is supported in simple bearings.

12. A nozzle for injecting hot-melt plastic into a sprue of a mold, the nozzle comprising:
    a housing securable to the mold over the sprue;
    a needle shiftable in a needle direction in the housing between a closed position fitting in and blocking the sprue and an open position unblocking the sprue;
    a holder part shiftable in the housing in the needle direction and fixed to the needle for joint movement therewith, the holder part having an entrainment pin projecting from the housing transverse to the needle direction; and
    an actuator shiftable in an actuator direction transverse to the needle direction and having a groove extending at an acute angle to the actuator direction and into which the pin engages such that shifting of the actuator in the actuator direction moves the pin and needle in the needle direction.

13. The nozzle defined in claim 12 wherein the groove is open toward the housing.

14. The nozzle defined in claim 12 wherein the housing is formed with a melt passage opening into the sprue.

15. The nozzle defined in claim 14 wherein the melt passage is almost entirely spaced from the needle.

16. The nozzle defined in claim 15 wherein the housing is formed with a bore opening at the sprue and in which the needle is shiftable, the melt passage opening into the bore where the bore opens into the sprue.

17. The nozzle defined in claim 12 wherein the actuator direction is a straight line.

* * * * *